Dec. 7, 1954  C. S. GODDIN, JR  2,696,494
EXTRACTION OF WATER-SOLUBLE ORGANIC ACIDS
Filed Dec. 13, 1949
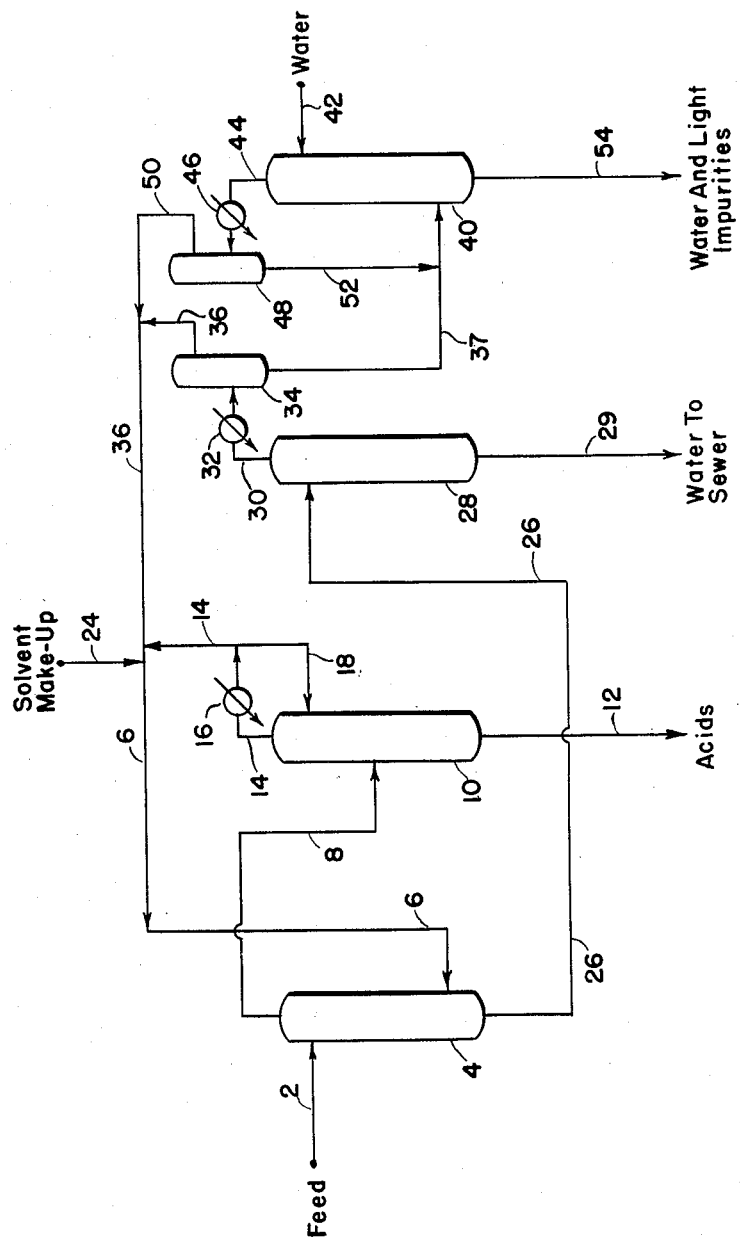
INVENTOR.
Clifton S. Goddin, Jr.
BY *Arthur McElroy*
ATTORNEY United States Patent Office 2,696,494
Patented Dec. 7, 1954

2,696,494

EXTRACTION OF WATER-SOLUBLE ORGANIC ACIDS

Clifton S. Goddin, Jr., Tulsa, Okla., assignor to Stanolind Oil and Gas Company, Tulsa, Okla., a corporation of Delaware Application December 13, 1949, Serial No. 132,678

5 Claims. (Cl. 260—450)

The present invention relates to a method for the extraction of organic acids from crude mixtures thereof. More particularly, it pertains to a procedure for preventing the accumulation of objectionable concentrations of contaminants in the extraction system.

The recovery of organic acids from their crude aqueous mixtures by the use of a relatively water-insoluble solvent has been practiced for some time; and, in batch-type operations or in continuous operations with relatively pure acid solutions, no serious problem arises in so far as concerns the maintenance of the extraction solvent in a state sufficiently pure to extract such acids efficiently. In continuous operations, however, when extracting acids containing non-acidic impurities, such as, for example, alcohols and carbonyl compounds, a problem arises due to steady accumulation of impurities in the solvent with resultant impairment in efficiency of the extraction system. Thus, difficulties of this nature have been encountered in the extraction of water-soluble acids produced as a by-product of the hydrocarbon-synthesis process. The crude primary water from the synthesis reaction constitutes a dilute aqueous mixture of acids, alcohols, aldehydes, ketones, and esters. By a topping operation, the bulk of the non-acidic chemicals can be removed, and an aqueous acidic bottoms is produced which contains small amounts of ethanol, propanol, acetone, and other impurities. Ethyl acetate has been found to be a suitable solvent for extracting the acids from the dilute solutions of this type.

While carrying out investigations on the continuous recovery of such acids using conditions as taught by others, it was observed that there was a relatively rapid accumulation of light impurities in the solvent system. Such accumulation of impurities, if allowed to continue, would not only reduce the extraction efficiency of the solvent but also would eventually lead to complete inoperability of the system. In this connection, one of the major impurities accumulating in the system was found to be ethanol. The presence of ethanol increases the miscibility of ethyl acetate and water; and, if build-up of ethanol in the solvent is allowed to approach 20 to 25 weight per cent, complete miscibility of ethyl acetate and water results, destroying the extractive action. When employing ethyl acetate as the solvent, this problem becomes further complicated, owing to partial hydrolysis thereof to ethanol and acetic acid, thereby tending to increase the miscibility of the solvent in the water layer.

Accordingly, it is an object of my invention to recover continuously, by the use of a suitable solvent, water-soluble carboxylic acids from aqueous mixtures thereof containing impurities which boil below or which azeotrope with such solvent, while maintaining the solvent utilized in the extraction step in a state of high purity. It is a further object of my invention to provide a method for the recovery of water-soluble carboxylic acids from crude aqueous mixtures thereof containing light impurities, by means of a substantially water-insoluble solvent, whereby the portion of the solvent solubilized in the raffinate fraction of the original crude mixture may be readily and continuously separated therefrom in substantially pure form. It is a still further object to provide a simple, economical method involving the continuous rejection of impurities from the solvent extraction system with substantially complete recovery of the solvent in purified form.

Broadly, my invention comprises subjecting a crude aqueous mixture of the water-soluble carboxylic acids to extraction with a suitable substantially water-insoluble solvent and thereafter recovering the acids from the resulting extract by distilling the latter to obtain one fraction comprising essentially the solvent employed together with low-boiling contaminants and a second fraction containing the desired acids and high-boiling impurities, which can then be separated from the acids by further purification steps. The first fraction, comprising solvent and low-boiling impurities, is combined with make-up solvent and recycled to the extraction step. The raffinate layer from the original extraction step contains the bulk of the low-boiling impurities originally present in the crude acid mixture together with an appreciable quantity of solubilized solvent. This aqueous raffinate is introduced into a distillation column where the bulk of the water is rejected from the system as bottoms together with any high-boiling impurities that might be present. The overhead fraction obtained in this operation contains solvent, water, and low-boiling impurities. After permitting this fraction to stratify, the upper solvent layer is recycled to the extraction column and the lower aqueous layer containing the major portion of low-boiling impurities originally present in the crude acid mixture is withdrawn from the system and subjected to an extractive distillation operation using water as the extractive agent in accordance with known techniques whereby the solvent is obtained in substantially pure form as an overhead stream while a dilute aqueous solution of the low-boiling impurities is washed down the column and rejected.

The process of my invention may be used in conjunction with numerous systems employed in the recovery and purification of carboxylic acids wherein the presence of substantial concentrations of low-boiling impurities interferes with the proper function of the solvent. My invention is particularly adapted to the recovery of water-soluble acids produced along with other oxygenated organic chemical components in the hydrogenation of carbon monoxide in the presence of a fluidized alkali-promoted iron catalyst under known synthesis conditions. In recovering the water-soluble chemicals found in the aqueous fraction produced by the reaction of carbon monoxide with hydrogen, referred to above, the entire fraction is subjected to a topping operation in which the bulk of the non-acid chemicals is taken overhead and further processed, while the acid components of this fraction, together with a minor portion of the non-acid chemicals, are removed from the column as a dilute (about 4 to 6 weight per cent acids) aqueous bottoms. It is bottoms fractions of this general type which are contemplated as feed stocks in carrying out the process of my invention. While feed stocks of this type contain numerous impurities, the ones which cause difficulty due to accumulation in the continuous extraction system are those which boil below the boiling point of the solvent employed, those which form azeotropes with the solvent, and those which form with other impurities azeotropes boiling below the boiling point of such solvent. For convenience, impurities coming within any of the three classifications noted above are herein referred to as "low-boiling contaminants" or as "low-boiling impurities." The difficulty of purifying the solvent by conventional distillation methods can be further appreciated by reference to the table below, in which the boiling points of common impuritiles are compared with that of the solvent (ethyl acetate). It will be understood that the impurities are shown merely as typical of those encountered and are to be in no way construed as limiting the scope of my invention.

| Component: | B. P., °C. |
|---|---|
| Acetone-methanol | 55.7 |
| Methanol | 64.7 |
| Butyraldehyde-ethanol-water | 67.2 |
| Ethyl acetate-ethanol-water | 70.3 |
| Ethyl acetate-water | 70.4 |
| Methyl ethyl ketone-ethanol-water | 73.2 |
| Methyl ethyl ketone-water | 73.5 |
| Ethyl acetate | 77.1 |

One of the outstanding and surprising features of my invention resides in the discovery that extraction systems of the type here involved can be effectively maintained in a state of high efficiency merely by periodically or continuously removing from the system the small amount of water layer obtained by distillation of the aqueous raffinate produced in the extraction step. In normal operation, this water layer amounts to about 1 per cent of the solvent circulation rate. In the conventional solvent acid recovery process, this water layer is recycled within the system and the impurities gradually accumulate in the solvent. It has unexpectedly been found that the objectionable light impurities occur in higher concentration in the water layer and that, by withdrawal of the aforesaid water layer, build-up of light impurities throughout the solvent system can be prevented. It has been found further that by subjecting the water layer to extractive distillation, using water as an extractive agent, the solvent can be easily and continuously separated from the light impurities and returned to the system.

For a better understanding of my invention, reference is made to the accompanying flow diagram, in which a crude aqueous acidic feed is introduced through line 2 to extraction column 4 at an hourly rate of 190 pounds of high-boiling impurities, 138 pounds of low-boiling impuritiles, 5,611 pounds of acids (chiefly acetic, propionic, and butyric acids), and 139,900 pounds of water. The extraction solvent is introduced near the bottom of column 4 through line 6 at a rate corresponding to a solvent aqueous feed ratio of 1.5. The extract rich in acids is withdrawn through line 8 and introduced into acid stripping column 10. Column 10 is operated at a bottoms temperature of about 131° C. to insure the substantially complete removal of ethyl acetate from the column as a component of the overhead stream. The resulting bottoms acid fraction, together with high-boiling impurities, is withdrawn through line 12. The overhead stream from column 10, containing chiefly ethyl acetate and water, is withdrawn through line 14 and condenser 16, a portion of the stream being returned to the top of the column as reflux through line 18 and the remainder combined with solvent (ethyl acetate) in line 6 and make-up ethyl acetate from line 24 and recycled to extraction column 4. The aqueous bottoms from extraction column 4, which contains some ethyl acetate, light impurities, and unextracted acids, is withdrawn through line 26 and introduced into stripping column 28. In the operation of column 28, a bottoms fraction comprising the bulk of the water in the system is withdrawn through line 29 and run to the sewer. An overhead stream, consisting chiefly of ethyl acetate, water, and some light impurities, is withdrawn through line 30 and condenser 32, introduced into separator 34, and allowed to stratify into two layers. The upper solvent layer is withdrawn from separator 34 through line 36 at an hourly rate of 695 pounds of low-boiling impurities, 760 pounds of water, and 12,164 pounds of ethyl acetate, while the lower aqueous layer is withdrawn through line 37 and introduced into extractive distillation column 40 at an hourly rate of 138 pounds of low-boiling impurities, 1,495 pounds of water, and 136 pounds of ethyl acetate. In carrying out this extractive distillation, water is introduced into the top of column 40 through line 42 at an hourly rate of 5,970 pounds. An overhead consisting essentially of ethyl acetate and water is withdrawn through line 44 and condenser 46, and the resulting condensate sent to separator 48, where two layers are formed. The upper layer, consisting of ethyl acetate together with solubilized water, is withdrawn from separator 48 through line 50, where it may be combined with the solvent in lines 6 and 36 and recycled to extraction column 4. The lower aqueous layer in separator 48 is withdrawn through line 52 and returned to column 40 via line 37. The bottoms from column 40 consists chiefly of low-boiling contaminants and water and is withdrawn through line 54 at an hourly rate of 138 pounds of low-boiling contaminants and 7,458 pounds of water.

The description given immediately above is merely illustrative of one embodiment of my invention, and it is to be strictly understood that this invention is not limited thereto. For example, solvents other than ethyl acetate may be employed, such as propyl acetate, isopropyl ether, or any of the other known substantially water-insoluble acid solvents or mixtures thereof boiling sufficiently below acetic acid to permit satisfactory separation of the solvent from the acid by fractional distillation. Other modifications in the process of my invention which would normally occur to those skilled in the art are to be construed as lying within the scope thereof.

I claim:

1. In a continuous process for the recovery of water-soluble, organic, carboxylic acids from a crude aqueous mixture thereof containing low-boiling, water-soluble, non-acid, oxygenated, organic compounds as contaminants, the steps which comprise subjecting said crude mixture to extraction with a substantially water-insoluble solvent for said acids and boiling substantially below the boiling point of any of such acids, distilling the resulting aqueous raffinate from the aforesaid extraction step; collecting an overhead fraction comprising solvent, water and low-boiling contaminants soluble in said solvent and a bottoms fraction consisting essentially of water, allowing said overhead to stratify into an upper solvent layer containing a minor amount of said low-boiling impurities with respect to the solvent present in said upper layer and a lower aqueous layer containing said low-boiling impurities, returning said upper solvent layer to the above-mentioned extraction step, and withdrawing said lower aqueous layer from the extraction system.

2. The process of claim 1 in which ethyl acetate is employed as the solvent.

3. The process of claim 1 wherein the aqueous mixture of crude acids treated is produced by the hydrogenation of carbon monoxide in the presence of a fluidized alkaline-promoted iron catalyst under known synthesis conditions.

4. The process of claim 1 wherein the aqueous mixture of crude acids treated is produced by the hydrogenation of carbon monoxide in the presence of a fluidized alkaline-promoted iron catalyst under known synthesis conditions and wherein the solvent is ethyl acetate.

5. The process of claim 1 in which the lower aqueous layer withdrawn from the extraction system is subjected to extraction distillation with water to obtain overhead a highly-purified solvent fraction.

References Cited in the file of this patent

UNITED STATES PATENTS

| Number | Name | Date |
|---|---|---|
| 2,211,087 | Weimann | Aug. 13, 1940 |
| 2,419,039 | Scarth | Apr. 15, 1947 |
| 2,430,086 | Staff | Nov. 4, 1947 |
| 2,505,752 | Burton | May 2, 1950 |
| 2,526,508 | Scheeline et al. | Oct. 17, 1950 |
| 2,563,739 | Palm et al. | Aug. 7, 1951 |
| 2,568,717 | Burton et al. | Sept. 25, 1951 |
| 2,571,151 | McGrath et al. | Oct. 16, 1951 |